United States Patent [19]

Vinal et al.

[11] Patent Number: 4,816,947
[45] Date of Patent: Mar. 28, 1989

[54] SINGLE TRACK VERTICAL AND HORIZONTAL RECORDING READ/WRITE HEAD DESIGN

[75] Inventors: Albert W. Vinal, Cary, N.C.; David A. Thompson, San Jose, Calif.

[73] Assignee: International Business Machines, Armonk, N.Y.

[21] Appl. No.: 119,502

[22] Filed: Nov. 12, 1987

[51] Int. Cl.⁴ ............................................... G11B 5/30
[52] U.S. Cl. ..................................... 360/113; 360/126
[58] Field of Search ........................ 360/113, 126, 121

[56] References Cited

U.S. PATENT DOCUMENTS 4,673,998  6/1987  Souda .................................. 360/113

Primary Examiner—A. J. Heinz
Attorney, Agent, or Firm—Edward H. Duffield

[57] ABSTRACT

A single track read/write head design is disclosed in which a pair of solid state magnetically permeable sensors such as coupled film magneto resistive sensors are joined together with a central flux conducting probe in the general form of a T or Y connection with the probe extending downward toward a magnetic record medium to conduct flux to or from the medium for writing or reading therefrom. Alternatively, a single coupled film magneto resistive sensor may be bifurcated at its central area at the intersection with the flux coupling probe. The resultant flux coupled from the magnetic medium is divided between the two sensors, or two halves of a sensor, where it alters the magneto resistive or other magnetic property of the sensor in a differential sense, i.e., the left half or left sensor will experience an increase or decrease in resistance while the right half or right sensor experiences an opposite decrease or increase in resistivity, respectively. The design permits the magnetically permeable sensors to be located at a remote elevation or distance from the record medium to reduce wear and critical lapping problems in manufacture. Allowing the sensors to lie in a generally horizontal plane relative to the magnetic record medium permits magnetic biasing of the magneto resistive sensors in a flux path which does not enter the medium itself and thus avoids unwanted flux coupling sensor and/or bias flux to the medium which interferes with reading and writing of the data record. The differential nature of the flux energization path of the two sensors or sensor halves results in common mode noise rejection from flying height variations between the coupling probe and the medium and of other electrical disturbances common to the circuits of the sensors.

29 Claims, 6 Drawing Sheets

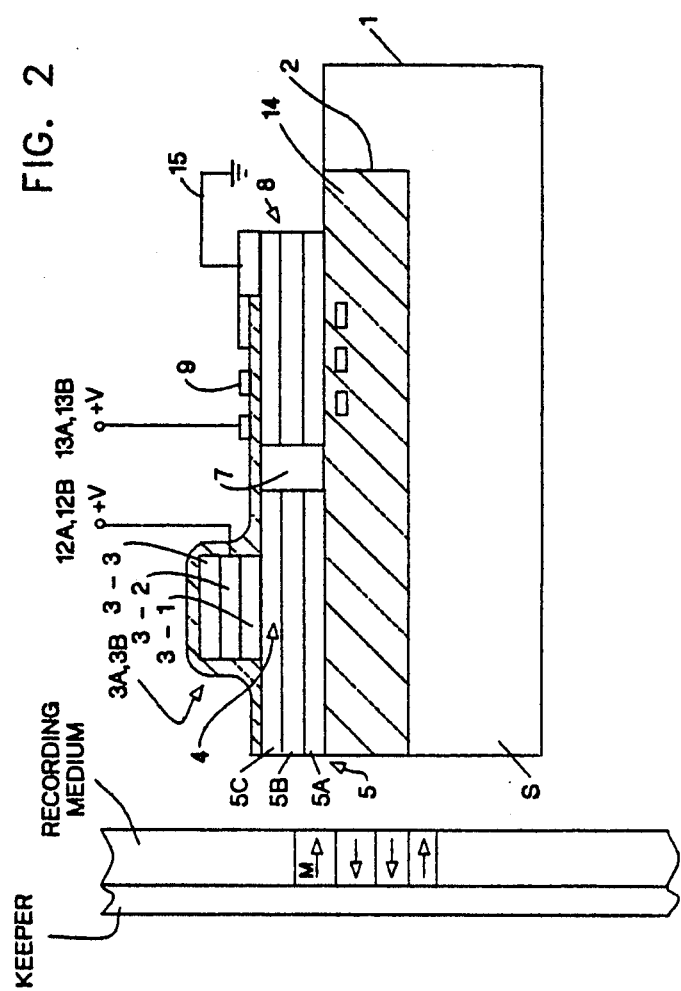

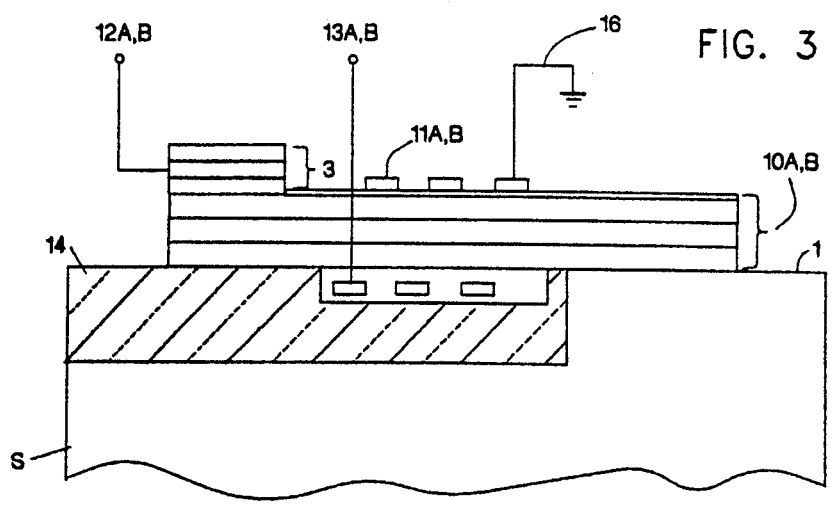
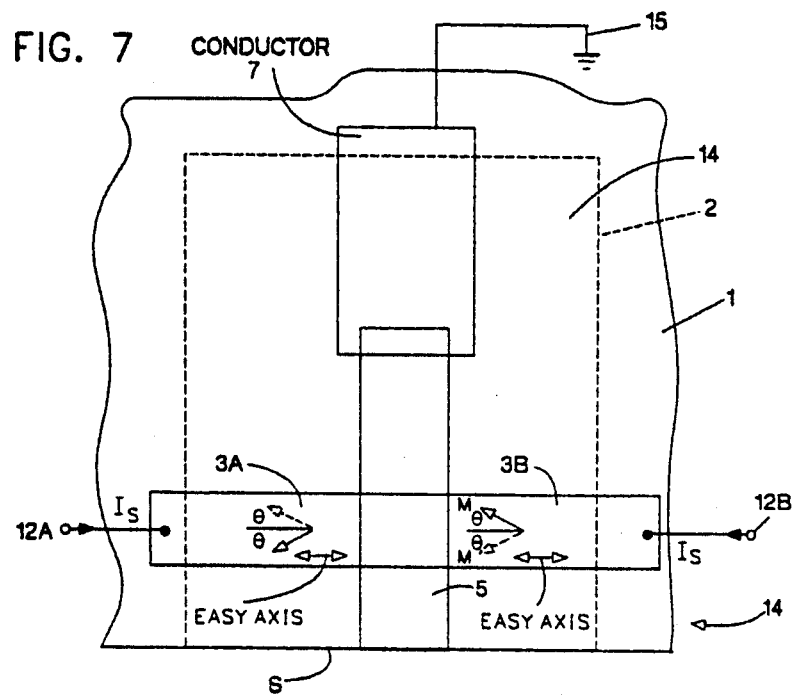

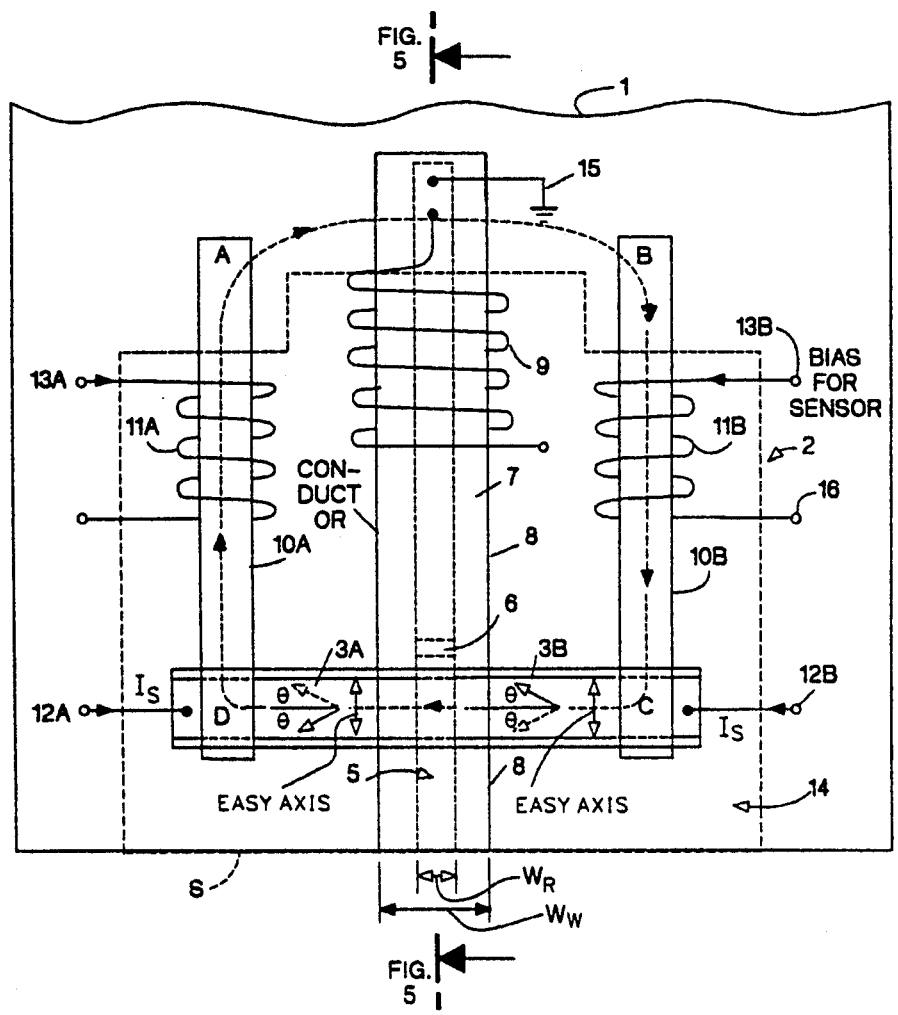

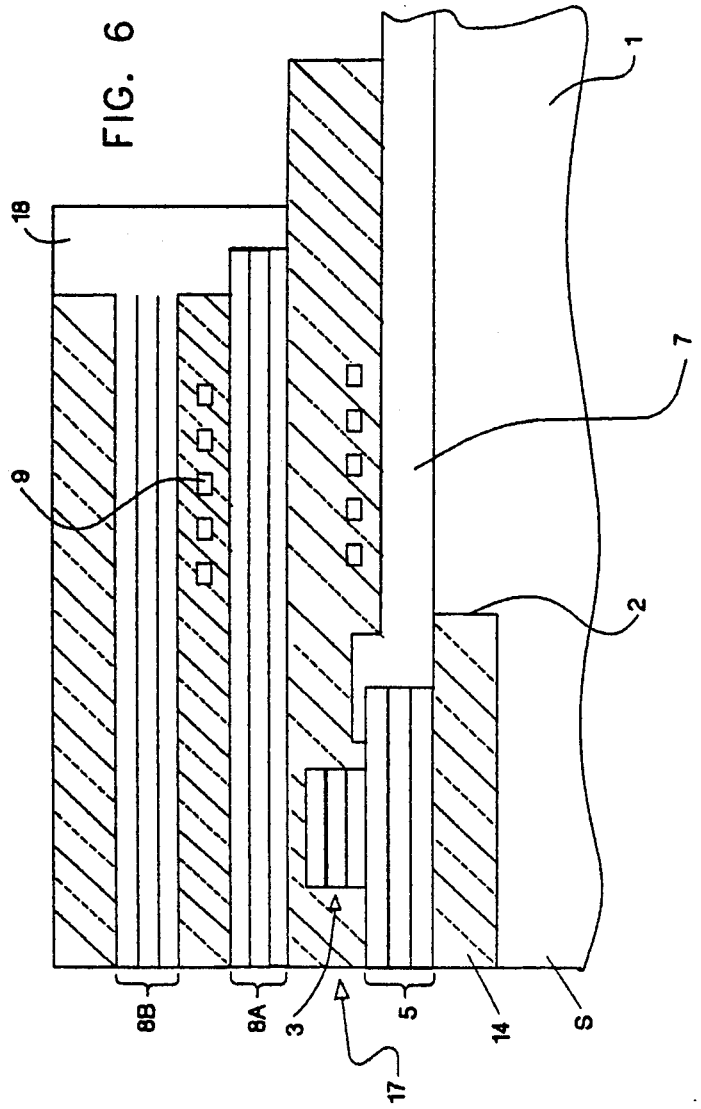

SINGLE TRACK VERTICAL AND HORIZONTAL RECORDING READ/WRITE HEAD DESIGN

RELATED APPLICATIONS

This application is related to a co-pending commonly assigned patent application Ser. No. 584,364, now U.S. Pat. No. 4,626,946 which deals with an improved coupled film magneto resistive sensor that may be employed in the present invention. This application is also related to the co-pending commonly assigned application Ser. No. 782,660 (U.S. Pat. No. 4,782,415) which illustrates a differential output twin track read/write head structure, and to simultaneously filed Ser. No. 119,501 which relates to improved biasing for read-write heads of the type described in the present invention.

FIELD OF THE INVENTION

The invention relates to magnetic recording read/write head structures in general and in particular to read/write heads employing solid state rather than inductive sensors.

PRIOR ART

A variety of prior patents dealing with read only and read/write head structures in this field are known to exist. Those having a magneto resistive or other solid state sensor located remote from the recording medium are exemplified by U.S. Pat. Nos. 3,921,217, 4,034,414 and 4,065,797. None of these patents represent an effective solution to the problem of employing remotely positioned solid state sensors in a single track read/write head structure since they either lack a differential signal output for common mode noise rejection, offer no control of Barkhausen noise generation or are not provided with a truly effective means of magnetically biasing the magneto resistive sensor element without coupling substantial magnetic flux biasing field into the record medium which interferes with the reading or writing of data thereon. For example, the aforementioned U.S. Pat. No. 4,065,797 has magneto resistive sensors with one sensor used for each track of data. The magneto resistive sensors are biased in a plane that is perpendicular to the surface of the recording medium and the longitudinal flux within the sensor, resulting from the biasing flux, will be conducted into the recording medium by virtue of the arrangement of the physical structure employed. This is a most undesirable result as will be readily appreciated by those of skill in the art since a flux density of the order of 0.70 Tesla will flow longitudinally along the sensor when the magnetic vector in the MR sensor is biased away from the easy axis. As a consequence, a significant magnetic field is coupled into the magnetic record medium and will either erase or seriously interfere with recording and reading of data therefrom.

U.S. Pat. No. 4,034,414 illustrates a similar difficulty but one in which the interference between the biasing field and the recording medium is slightly reduced by orienting the biasing field insofar as possible approximately parallel with the surface of the recording medium but in which the angle between the biasing plate and the magneto resistance element is optimal at about 45° which necessitates angling of the biasing plate with respect to the record medium. Unfortunately, a significant portion of the longitudinal magnetic flux flowing in the MR sensor is coupled into the medium. The design similarly does not employ differential sensors nor is the flux path from the record medium through the sensor capable of supporting and energizing two sensors in a differential mode.

U.S. Pat. No. 3,921,217 shows the essential aspect of removing a magneto resistive sensor from the proximity of the magnetic medium by providing a flux conducting coupling leg to carry flux from the medium through the sensor and through a return path back to the medium. However, when the sensor is biased, this structure will also couple an unwanted magnetic field to the medium and does not allow for differential signal sensing and provides no control over Barkhausen noise.

OBJECTS OF THE INVENTION

In view of the foregoing shortcomings in the prior art, it is an object of this invention to achieve a differential single track read/write head structure for either vertical or longitudinally recorded magnetic records that utilizes a solid state sensor and may be biased during read intervals without coupling any of the sensor's own magnetic field or any of the bias field to the record medium.

BRIEF SUMMARY

The foregoing and still other objects not specifically enumerated are provided in a read/write head design employing a single bifurcated magneto resistive sensor or two serially connected magneto resistive sensors which are jointed at a common point electrically and magnetically. The sensors are preferably arranged to lie in a plane parallel with the record medium and their inherent longitudinal magnetic fields are closed in a ferrite block and do not enter the record medium. Also, they are magnetically biased in a plane parallel with the record medium to avoid any coupling of bias flux resulting from the read/write head sensor bias elements into the record medium. A vertically oriented coupling probe or leg conducts signal flux alone to or from the record medium to the center of the single sensor which is bifurcated or to the junction point between two separate sensors where the flux coupled from the magnetic medium may be divided equally between the two sensors to increase or decrease the resistance in one sensor while decreasing or increasing that in the other, respectively, in a differential sensing mode.

The invention will now be described with reference to a preferred embodiment thereof as further described and disclosed with reference to the figures of the drawing in which:

BRIEF DESCRIPTION OF THE DRAWINGS

FIG. 2 illustrates a cross-sectional view through the center of FIG. 1 along section line BB.

FIG. 3 illustrates a sectional view of the structure in FIG. 1 along section lines AA.

FIG. 4 illustrates in plan view the schematic of a read/write head structure for writing in a wide path and reading in a narrow path and employing twin coupling probes, one probe for writing and the other for reading.

FIG. 6 illustrates an alternative structure similar to that in FIG. 5 but which may be employed utilizing two writing poles to facilitate longitudinal recording on the record medium rather than vertical recording.

FIG. 7 illustrates in plan view an alternative structure which can eliminate the magnetic bias coils and connecting pole pieces by orienting the easy axis of the magneto resistive sensors to lie longitudinally with the length of the sensors and biasing them off of the easy axis by passage of sensor current through them.

DETAILED SPECIFICATION

Figure 1:
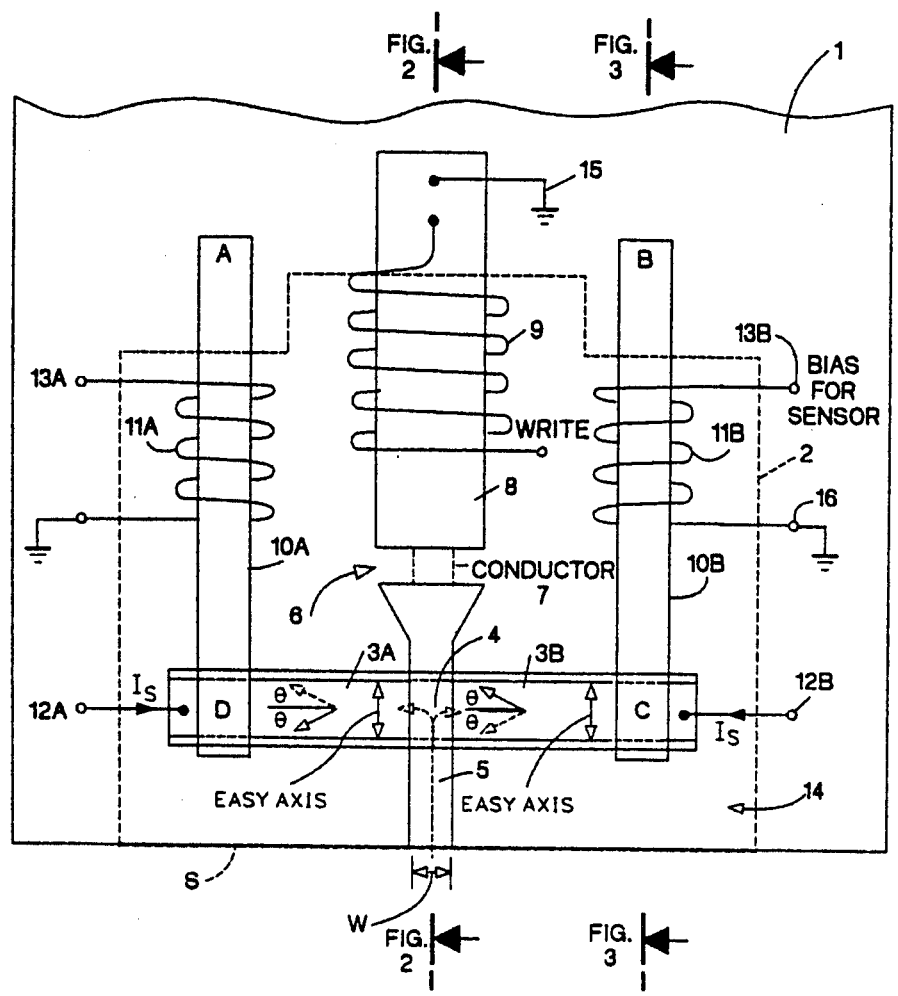
FIG. 1 illustrates a planar view of a solid state read/write differential sensing single track head design.

Turning to FIG. 1 of the drawings, a plan or head layout view showing the elements of the magnetic read/write head in a preferred embodiment of the invention is shown. A magnetically permeable electrically non-conductive ferrite material block 1 serves as a substrate or base upon which to build the elements of the magneto resistive sensor and various flux conductors according to this invention. Normal photo lithography and deposition techniques well known to those of skill in the art are employed and will not be described in further detail herein.

The end surface of the ferrite block 1 has been etched initially in a trenched area shown generally by the dashed-out line 2 which is then filled with glass or similar electrically and magnetically nonconductive material. This has the effect of separating the magnetically and electrically conductive elements which are to be deposited within the general area of the trenched out zone 2 from the ferrite block surface 1 to minimize leakage paths for magnetic flux where critical.

A magneto resistive sensor 3, which has been bifurcated or intersected at its center to form left half 3A and right half 3B, is deposited on the top surface of the glass which fills the area 2. The sensor halves 3A and 3B may be formed of two individual magneto resistive sensors. The two sensor areas for active magnetically sensitive legs which are joined at a common magnetically permeable connection at their center area 4 where they intersect with a magnetically permeable flux conductor lying in contact or in close physical proximity with the surface of the magneto resistive sensor strip which forms halves 3A and 3B for a tight and close flux coupling.

The flux conductor 5 conducts flux from the medium which was located adjacent to end surface S of the ferrite block 1 and it will be understood by those of skill in the art that a suitable magnetic record medium would be located parallel the surface S and relative motion between the read/write head and the record medium would occur in the direction running in and out of the plane of the drawing paper.

The magneto resistive sensor 3 is shown with its easy axis of magnetic anisotropy oriented perpendicular to the long direction of the sensor so that magnetic flux coupled from the flux conductor 5 will divide in the central area 4 joining the two sensor halves and pass equally in the left and right halves 3A and 3B along the longitudinal axis of the sensors to rotate the magnetic vectors in each magneto resistive sensor half in opposite directions, i.e., the rotation in the vectors in the left half, for example, being opposite to that in the right half, for example, to provide a differential sensing component.

The magnetic vectors are torqued parallel to their easy axis position by the sensor current $I_s$ supplied at terminals 12A and 12B and partially conducted through a central layer metal. An insulative material having non-magnetic properties may be used instead of metal as disclosed in my aforementioned U.S. Pat. No. 4,626,946 and seen to better effect in cross-sectional views, descriptions of which follow. The magnetic field produced by the sensor current $I_s$ which is conducted by the magnetic films and the central conductive layer has the effect of sustaining a mutually anti-parallel magnetic couple aligned with the easy magnetic axis in the preferred coupled thin film magneto resistive sensor structure which is shown in these drawings. Orienting the sensor easy axis parallel with the field produced by the sensor current has the effect of eliminating any interfering 180° domain walls within the magnetic films that otherwise would give rise to Barkhausen noise. Magnetic biasing to torque the magnetic vector couple in the thin film off of the easy axis is provided by the electromagnetic coils 11A, 11B and the coupling legs 10A and 10B which couple magnetic flux longitudinally through the sensor pair around the contours A, B, C and D. This low reluctance path passes through the ferrite block 1 between points A and B to form a complete closed loop so that no component of magnetic flux either from the sensor's inherent longitudinal magnetization or from the bias field applied to it exits from the end surface S into the magnetic record medium to interfere therewith. Magnetic bias field generation current is applied through terminals 13A and 13B to the windings 11A and 11B, respectively, as schematically indicated in FIG. 1.

A gap to prevent shunting sensing flux from the flux conductive member 5 during read-back of recorded signals from the medium is shown as a gap 6 having an intervening electrical but non-magnetic conductor 7. This may be gold or aluminum or any other similarly electrically conductive element which connect, via the flux conductor member 5 which is formed of electrically conductive material as well, to carry the sensing current $I_s$ to ground as shown at the top of FIG. 1. During writing, current $I_s$ passes through the coil of the write winding 9 to generate flux in core 8. Core 8 is of permalloy or other similarly magnetic and electrically conductive material and is utilized during writing of data on a magnetic record medium. Suitable electrical signal impulses would be applied to winding 9 to generate an intense electromagnetic field in core 8 which is coupled through the gap 6 to the flux conducting member 5 for application to the record medium. As disclosed in my aforementioned U.S. Pat. No. 4,626,946, the coupled film magneto resistive sensor 3A, 3B will be saturated magnetically during writing and will not conduct flux further once a critical field has been reached. This fact permits writing to occur utilizing the same flux conductive pole piece 5 as is used for read-back when the write winding 9 is no longer energized.

Turning to FIG. 2, the cross-sectional view along lines BB in FIG. 1 is illustrated. It may be seen that the ferrite block 1 has initially been etched or milled away to form a trench or recess 2 which is later filled with glass or other suitable non-magnetic, nonelectrically conductive material 14. Thereon are deposited a first layer for the magnetic flux coupling and electrically conductive probe 5 such as layer 5A of permalloy, for example. A sandwich-type structure is contemplated to eliminate domain walls and of Barkhausen noise, so a layer of non-magnetic and electrically conductive metal with high resistivity such as titanium is deposited as layer 5B followed by yet another layer of permalloy, layer 5C. The gap 6 which may be seen in FIG. 1 is then etched away and filled with non-magnetic electrically conductive material 7. This completes electrical connection to the core 8 of the writing electromagnet which has previously had the lower layer for its winding 9 deposited in the glass surface, i.e., glass filling 14 would be conducted up to a first level and then the copper or aluminum winding bars would be laid down followed by further deposition of glass or insulator up to a level even with the top of the trenched out area 2 in the ferrite block 1.

Next, the sensor 3 is laid down in a uniaxial field to accomplish uniaxial anisotropy with easy axis orientation as shown in FIG. 1, generally orthogonal to the long direction of the sensor as shown in FIG. 1. This also comprises a film sandwich structure of permalloy, non-magnetic metal followed by permalloy as shown by layers 3-1, 3-2 and 3-3 and as described in great detail in my aforementioned U.S. Pat. No. 4,626,946 which describes such sensors.

It may be seen that the flux coupling path from the recording medium during read-back would be from the recording medium, which may be vertically recorded as schematically shown in FIG. 2, into the end face of the coupling member 5 and from there into the underside of the magnetic sensor active legs 3A and 3B where it divides evenly as shown in FIG. 1 to pass through the left and right sensor legs 3A, 3B. The gap 6 as shown in FIG. 1 is filled with a conductive non-magnetic material. It can be seen in FIG. 2 in cross section. The purpose of the gap is to provide a higher reluctance path than that which exists between the flux coupling leg 5 and the active sensor legs 3A, 3B so that the majority of flux coupled from the medium passes through the sensors and the magnetic ferrite block.

Layer 3-2 conducts electricity for the sensing current $I_s$ which aids in establishing the anti-parallel arrangement and magnetization within the upper and lower magnetic film layers 3-1 and 3-3 as disclosed in may aforementioned U.S. Pat. No. 4,626,946. The current is conducted away to ground by the ground connection 15 through the upper layer of the core material 8 forming the writing electromagnet. Core 8 may be formed of a similar sandwich of metals as described for the flux conductor 5 or for the coupled film magneto resistive sensors 3. It is only required that it be electrically and magnetically conductive for the present design. Conductor 7 is electrically conductive but non-magnetic as will be appreciated.

Turning to FIG. 3, the magnetic field biasing arrangement used to torque magnetization within the coupled film magneto resistive sensors 3A, 3B away from the easy axis, as illustrated in FIG. 1, is shown in cross section AA taken from FIG. 1. In FIG. 3, an electromagnetic core 10A, 10B comprising a sandwich of alternately magnetic and non-magnetic conductive metals is shown together with an electrical winding 11A or 11B respectively which is insulated electrically from core element 10A, 10B and supplied with suitable electrical current through terminal 13A, 13B and ground 16. The coupled film magneto resistive sensor 3 is supplied with its sensing current as schematically shown by the terminal 12A and 12B in this figure.

During read-back of recorded data bits from a record medium located adjacent to the surface S, magnetic flux is generated in the core 10A and 10B by passing an appropriate current through terminals 13A, 13B and ground 16 in the winding 11A, 11B shown in FIG. 1. The magnetic flux thus generated is coupled entirely into the coupled film magneto resistive sensors 3 passing longitudinally through them as with the sensor's inherent longitudinal magnetization flux and back through the ferrite block 1 around the path shown in FIG. 1. This may be seen in FIG. 3 to pass through the length of the core 10, up into the underside of the magneto resistive sensors 3, through the length of sensors 3, back through the length of the other core 10A or 10B and into the ferrite material underneath it and longitudinally back through the ferrite material to the adjacent core 10A or 10B. The magnetic biasing flux path as with the inherent sensor magnetization's path is thus a closed loop and has no components which exit from the surface S to interfere with data written on magnetic medium adjacent to surface S. The magnetic bias flux torques magnetization within the MR sensor films to rest at angle $\theta$ relative to the easy axis which is shown to be orthogonal to the length of the sensors 3A, 3B in FIG. 1.

As will be described subsequentially, it is not necessary that the sensor's easy axis be orthogonal to its long axis. Instead, it may be chosen to be parallel with the long axis of the sensor 3A and 3B thus making it possible to eliminate entirely the magnetic biasing cores and windings 10A, 10B, 11A, 11B, respectively. Sensor current passed through terminals 12A and 12B provides both magnetic biasing and sensing current.

It will be appreciated that what has been described with reference to FIGS. 1 through 3 constitutes a single pole, single track differentially sensitive read/write structure for vertical recording in a magnetic medium. It is often desirable to write in a wide track and to read back in a narrow track to avoid difficulties with track misregistration as will be readily understood by those of skill in this field. In order to provide an effective write wide, read narrow structure, the alternative embodiment as shown in FIG. 4 is offered.

In the structure shown in FIG. 4, the coupling member, which couples flux to or from the medium, has a width $W_r$ for reading, while the pole piece 8, which is the core for the electromagnet used in writing, is extended and has a width $W_w$ where it interfaces surface S. Write probe width $W_w$ is wider than that of the read pole piece or flux coupling member 5. It will be understood that layer 8 overlies layer 5 and is separated therefrom by a suitable insulator of suitable thickness to minimize leakage flux coupling losses back to the flux coupling member 5 from the pole piece 8.

The remaining portion of the structure shown in FIG. 4 is essentially the same as that shown in FIGS. 1 through 3 with the exception of the conductor filled reluctance gap 6 may now extend from the end of the flux coupling leg 5 after it has passed under sensor leg 3 all the way back to the terminus of the core piece 8.

Figure 5:
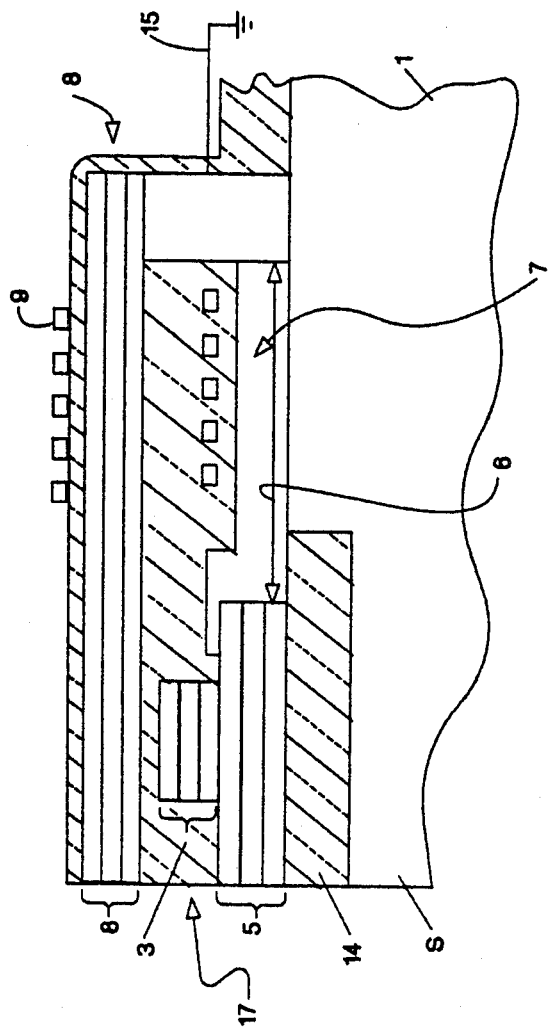
FIG. 5 illustrates a longitudinal cross section through the center of the structure in FIG. 4.

FIG. 5 illustrates a central vertical section taken along section lines AA in FIG. 4 and provides for vertical write wide, vertical read narrow read/write head structure. The central read-back flux coupling leg 5 is constructed in similar fashion to that shown in the aforementioned figures and couples flux read back from the record medium to the magneto resistive sensors 3 in the same fashion as before. Sensor current from the central layer of the sensors 3 is conducted away through metal 7 to electrical ground 15 as before. The magnetic biasing flux means is not seen in cross section in FIG. 5 because that section is not represented in FIG. 5. Its structure would be the same as that previously described with respect to FIG. 3.

The write flux generating core 8 has a winding 9 as previously illustrated with respect to FIGS. 1 and 2.

However, core 8 extends all the way down to the surface S of the ferrite block and is used to record or impress vertical magnetization patterns in a magnetic record medium, not shown. This structure permits writing in a relatively wide track as shown in the schematic drawing, FIG. 4 and read back in a narrower track. The pole pieces at the end faces of the flux coupling members 5 and 8 are separated from one another by a space filled with glass or insulator 17 of sufficient thickness to create a greater reluctance path than that which would be exhibited between the end faces of the pole pieces and the magnetic record medium.

An alternative embodiment of the invention as shown in FIGS. 1 through 5 can be constructed to write and to read longitudinally recorded patterns in a magnetic record medium. The modifications are seen to better advantage in FIG. 6.

In FIG. 6, electromagnetic writing core 8 is divided into two legs, 8A and 8B, joined by a bridging structure 18 of permalloy or other suitably magnetic material. The winding 9 for energizing for writing is as described with reference to the foregoing figures. Sensor 3 and the flux coupling member 5 are also as previously described. The end faces of the core 8 represent pole pieces 8A and 8B to confront a magnetic record medium and to simultaneously couple flux into and out of the medium in a longitudinal path for longitudinal rather than vertical recording. In read-back mode, flux is coupled from the fringent fields at the flux reversal boundaries in the record medium through the end face of the pole piece 5 and into the ferrite block 1. The flux coupled into the pole piece 5 passes through the sensors 3 and back into the ferrite block at points A and B as shown in FIG. 1 as it does with the other configurations illustrated.

As previously alluded to, a modification for a read-only head may be made which eliminates the necessity of the electromagnetic core and coil biasing structures.

FIG. 7 illustrates this alternative in a plan view similar to FIG. 1. The major elements remain the same except that the magneto resistive sensors are laid down in the presence of a uniaxial magnetic field that orients the easy axis of magnetization longitudinally rather than orthogonally to the length of the sensors. Sensor current $I_s$ is supplied through terminals 12A and 12B to the central electrically conductive non-magnetic layer of a coupled film magnetic sensor structure, for example, as previously described. This current generates a magnetic biasing field oriented orthogonal to the sensor's longitudinal easy axis which torques magnetization to rest at the angle $\theta$ as illustrated schematically in FIG. 7. The longitudinal flux flowing in the MR sensor closes through the ferrite block in a direction parallel to the recording media preventing flux from the sensor from entering the recording media through the central reading probe 5. The flux coupling member 5 still couples magnetic flux from the surface S which confronts a magnetic recording medium through the active legs 3A and 3B and back into the ferrite block 1. Electrical current $I_s$ for biasing and sensing is conducted through the conductive member 7 which is non-magnetic to ground 15. The writing structure is not shown in FIG. 7 but would be constructed in similar fashion to that depicted in FIG. 5. This prevents the coupling of flux from the writing coil and core from being coupled into the MR sensors 3A, 3B and possibly upsetting the at rest easy axis magnetization or creation of unwanted magnetic domain walls within the sensors.

It will be appreciated that what has been described is an improved magnetic read/write head structure that is capable of providing a differentially sensitive configuration with magnetic biasing paths that do not intersect with the magnetic recording medium. Both vertical and horizontal read/write structures utilizing the bias design for the sensitive elements and biasing structure have been shown. As will be readily apparent to those of ordinary skill in the art, numerous modifications in the detail of structure may be contemplated without departing from the spirit and scope of the invention herein. Therefore, what is desired to be protected by Letters Patent is shown in the claims appended hereto by way of illustration only and not by way of limitation.

What is claimed is:

1. A magnetic read/write head apparatus, comprising:
   at least two longitudinally magnetically conductive permeable magnetic sensor legs, for sensing magnetic flux passing therethrough, said legs having distal and proximate ends, and said proximate ends being joined at a first common magnetically permeable connection;
   a first magnetically permeable flux conducting means for conducting magnetic flux to or from a magnetic record medium; and
   said first flux conducting means being magnetically connected to said first common connection at said proximate ends of said legs to conduct flux equally thereto or therefrom.

2. Apparatus as described in claim 1, further comprising:
   means for applying magnetic recording flux signals to said first flux conducting means to record said magnetic flux signals on a magnetic record medium.

3. Apparatus as described in claim 2, further comprising:
   a magnetic reluctance means in serial magnetic circuit connection between said means for applying flux and said first flux conducting means.

4. Apparatus as described in any one of claims 1-3, wherein:
   said magnetic sensor legs comprise magneto resistive elements.

5. Apparatus as described in claim 4, further comprising:
   a magnetic biasing means comprising a source of constant magnetic flux and means for applying said flux to said active sensor legs in series for biasing their inherent magnetism at an angle with respect to the easy axis of magnetization within said legs.

6. Apparatus as described in claim 5, wherein:
   said active sensor legs comprise magnetically coupled layers, said layers being separated from one another by an intervening, non-magnetic material;
   said active sensor legs being supplied with electrical current and generating an anti-parallel magnetic vector couple in said layers.

7. Apparatus as described in claim 6, wherein:
   said first flux conducting means comprises an electrically conductive portion which is in electrical connection with said sensor legs at said first common connection.

8. Apparatus as described in claim 5, wherein said means for biasing comprises:

an electromagnetic coil surrounding a magnetically permeable core, said core being in a magnetic series circuit connected to and including said sensor legs.

9. Apparatus as described in claim 8, wherein said core of said electromagnet comprises:
a laminated sandwich of alternating layers of magnetically permeable material and non-magnetic material overlying one another throughout the length of said core.

10. Apparatus as described in claim 4, wherein:
said magneto resistive elements comprise a single magneto resistive sensor divided at its center to form said two legs, said common connection being at the point of division of said single magneto resistive sensor and, said two active legs being the portions of said sensor on either sides of said connection.

11. Apparatus as described in claim 10, further comprising:
a magnetic biasing means comprising a source of constant magnetic flux and means for applying said flux to said active sensor legs in series for biasing their inherent magnetism at an angle with respect to the easy axis of magnetization within said legs.

12. Apparatus as described in claim 11, wherein said means for biasing comprises:
an electromagnetic coil surrounding a magnetically permeable core, said core being in a magnetic series circuit connected to and including said sensor legs.

13. Apparatus as described in claim 12, wherein said core of said electromagnet comprises:
a laminated sandwich of alternating layers of magnetically permeable material and non-magnetic material overlying one another throughout the length of said core.

14. Apparatus as described in claim 10, wherein:
said active sensor legs comprise magnetically coupled layers, said layers being separated from one another by an intervening, non-magnetic, material;
said active sensor legs being supplied with electrical current and generating an anti-parallel magnetic vector coupled in said layers.

15. Apparatus as described in claim 14, wherein:
said first flux conducting means comprises an electrically conductive portion which is in electrical connection with said sensor legs at said first common connection.

16. Apparatus as described in claim 4, further comprising:
a second magnetically permeable flux conducting means for conducting magnetic flux to or from a magnetic record medium.

17. Apparatus as described in claim 16, wherein:
said second flux conducting means is wider in its dimension where it is proximate to said record medium than is said first flux conducting means where it is proximate to said magnetic record medium.

18. Apparatus as described in claim 17, further comprising:
means for applying magnetic recording flux signals to said second flux conducting means to record said magnetic signals on a magnetic record medium.

19. Apparatus as described in claim 16, wherein:
said second magnetically permeable flux conducting means further comprises two flux conducting legs arranged in a closed loop series magnetic circuit with said record medium and said means for applying magnetic flux, said two legs being separated from each other and arranged to confront said record medium.

20. Apparatus as described in claim 19, wherein:
said second flux conducting means is wider in its dimension where it is proximate to said record medium than is said first flux conducting means where it is proximate to said record medium.

21. Apparatus as described in claim 20, further comprising:
means for applying magnetic recording flux signals to said second flux conducting means to record said magnetic signals on a magnetic record medium.

22. Apparatus as described in claim 16, further comprising:
means for applying magnetic recording flux signals to said second flux conducting means to record said magnetic signals on a magnetic record medium.

23. Apparatus as described in any one of claims 1–3 further comprising:
a second magnetically permeable flux conducting means for conducting magnetic flux to or from a magnetic record medium.

24. Apparatus as described in claim 23, wherein:
said second flux conducting means is wider in its dimension where it is proximate to said record medium than is said first flux conducting means where it is proximate to said magnetic record medium.

25. Apparatus as described in claim 24, further comprising:
means for applying magnetic recording flux signals to said second flux conducting means to record said magnetic signals on a magnetic record medium.

26. Apparatus as described in claim 23, wherein:
said second magnetically permeable flux conducting means further comprises two flux conducting legs arranged in a closed loop series magnetic circuit with said record medium and said means for applying magnetic flux, said two legs being separated from each other and arranged to confront said record medium.

27. Apparatus as described in claim 26, wherein:
said second flux conducting means is wider in its dimension where it is proximate to said record medium than is said first flux conducting means where it is proximate to said magnetic record medium.

28. Apparatus as described in claim 27, further comprising:
means for applying magnetic recording flux signals to said second flux conducting means to record said magnetic signals on a magnetic record medium.

29. Apparatus as described in claim 23, further comprising:
means for applying magnetic recording flux signals to said second flux conducting means to record said magnetic signals on a magnetic record medium.

* * * * *